US007824261B2

(12) United States Patent
Kojima

(10) Patent No.: US 7,824,261 B2
(45) Date of Patent: Nov. 2, 2010

(54) GAMING MACHINE WITH SECOND SYMBOLS SUBSTITUTABLE FOR FIRST SYMBOLS DURING A FEATURE GAME

(75) Inventor: Sakiko Kojima, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1362 days.

(21) Appl. No.: 11/136,519

(22) Filed: May 25, 2005

(65) Prior Publication Data

US 2005/0266911 A1 Dec. 1, 2005

(30) Foreign Application Priority Data

May 31, 2004 (JP) .......................... P2004-161944

(51) Int. Cl.
*G06F 17/00* (2006.01)
*G06F 19/00* (2006.01)

(52) U.S. Cl. ............................ 463/20; 463/16; 463/17; 463/18; 463/19; 463/25; 273/138.1

(58) Field of Classification Search ............. 463/16–20
See application file for complete search history.

(56) References Cited

U.S. PATENT DOCUMENTS

| | | | | |
|---|---|---|---|---|
| 5,423,539 | A * | 6/1995 | Nagao | 463/20 |
| 6,159,097 | A * | 12/2000 | Gura | 463/20 |
| 6,190,254 | B1 | 2/2001 | Bennett | |
| 6,290,600 | B1 * | 9/2001 | Glasson | 463/20 |
| 6,347,996 | B1 * | 2/2002 | Gilmore et al. | 463/17 |
| 6,364,766 | B1 | 4/2002 | Anderson et al. | |
| 6,439,993 | B1 * | 8/2002 | O'Halloran | 463/16 |
| 6,471,208 | B2 * | 10/2002 | Yoseloff et al. | 273/143 R |
| 6,612,927 | B1 * | 9/2003 | Slomiany et al. | 463/16 |
| 6,646,695 | B1 | 11/2003 | Gauselmann | |
| 7,014,559 | B1 * | 3/2006 | Fong | 463/20 |
| 7,371,171 | B1 * | 5/2008 | Englman et al. | 463/20 |
| 2002/0022509 | A1 * | 2/2002 | Nicastro et al. | 463/15 |
| 2002/0025846 | A1 * | 2/2002 | Bennett et al. | 463/20 |
| 2002/0082075 | A1 | 6/2002 | Meyer | |
| 2002/0107075 | A1 | 8/2002 | Stephan | |

(Continued)

FOREIGN PATENT DOCUMENTS

EP 0 431 724 6/1991

(Continued)

*Primary Examiner*—Peter DungBa Vo
*Assistant Examiner*—Milap Shah
(74) *Attorney, Agent, or Firm*—Arent Fox LLP

(57) ABSTRACT

In the gaming machine according to the present invention, when symbols are displayed within display regions of a display means, a determination means determines, from a combination of symbols displayed, establishment/non-establishment of the shift condition. More specifically, the determination means determines that the shift condition is established when a predetermined number or more first symbols are displayed within the at least one display regions. Further, a condition control means for controlling, when the first symbols displayed within the at least one display regions are less than the predetermined number and when a second symbols are displayed within the display regions, to establish the shift condition by the first symbols and the second symbols. Accordingly, even when the first symbols displayed within the display regions are less than predetermined number, the player can look forward to the shift to the bonus game and therefore feel interest more than in a conventional gaming machine.

4 Claims, 10 Drawing Sheets

U.S. PATENT DOCUMENTS

| | | | | |
|---|---|---|---|---|
| 2003/0013517 | A1* | 1/2003 | Bennett et al. | 463/25 |
| 2003/0045343 | A1* | 3/2003 | Luccesi et al. | 463/20 |
| 2003/0060266 | A1* | 3/2003 | Baerlocher | 463/20 |
| 2003/0073483 | A1* | 4/2003 | Glavich et al. | 463/20 |
| 2003/0176216 | A1* | 9/2003 | Storey | 463/25 |
| 2003/0203752 | A1* | 10/2003 | Kaminkow et al. | 463/20 |
| 2003/0222402 | A1* | 12/2003 | Olive | 273/292 |
| 2004/0043815 | A1* | 3/2004 | Kaminkow | 463/25 |
| 2004/0048646 | A1* | 3/2004 | Visocnik | 463/16 |
| 2004/0053679 | A1* | 3/2004 | Getz et al. | 463/20 |
| 2005/0026676 | A1* | 2/2005 | Olive | 463/20 |
| 2005/0170878 | A1* | 8/2005 | Tachikawa | 463/16 |

FOREIGN PATENT DOCUMENTS

| | | | |
|---|---|---|---|
| EP | 0 840 264 | A1 | 5/1998 |
| EP | 0 886 250 | | 12/1998 |
| EP | 1 063 622 | A2 | 12/2000 |
| GB | 2 326 505 | A | 12/1998 |
| GB | 2 326 514 | A | 12/1998 |
| GB | 2 393 018 | A | 3/2004 |
| JP | 2002-537874 | A | 11/2002 |
| WO | 03/28829 | A1 | 4/2003 |
| WO | 2004/025593 | A2 | 3/2004 |

* cited by examiner (a)

*Fig.8*

| A | B | C | D | E |
|---|---|---|---|---|
| T12 | T6 | T9 | T11 | T12 |
| T11 | T9 | T10 | T12 | T9 |
| T2 | T2 | T2 | T2 | T2 |
| T12 | T6 | T8 | T11 | T12 |
| T11 | T10 | T11 | T10 | T9 |
| T7 | T12 | T2 | T2 | T4 |
| T9 | T4 | T5 | T9 | T7 |
| T8 | T8 | T9 | T10 | T5 |
| T10 | T12 | T12 | T1 | T10 |
| T4 | T7 | T1 | T9 | T1 |
| T5 | T6 | T9 | T10 | T11 |
| T11 | T9 | T11 | T7 | T7 |
| T3 | T1 | T8 | T5 | T10 |
| T7 | T8 | T2 | T10 | T8 |
| T10 | T12 | T2 | T3 | T4 |
| T9 | T6 | T2 | T8 | T12 |
| T6 | T3 | T7 | T9 | T6 |
| T12 | T12 | T9 | T6 | T11 |
| T11 | T6 | T10 | T4 | T8 |
| T4 | T7 | T3 | T10 | T12 |
| T10 | T11 | T11 | T8 | T11 |
| T12 | T5 | T10 | T5 | T6 |
| T1 | T7 | T6 | T9 | T9 |
| T7 | T6 | T11 | T3 | T5 |
| T12 | T12 | T9 | T7 | T8 |
| T8 | T8 | T8 | T10 | T11 |
| T11 | T7 | T12 | T11 | T7 |
| T7 | T10 | T11 | T6 | T5 |
| T9 | T6 | T5 | T8 | T10 |
| T4 | T8 | T10 | T11 | T6 |

GAMING MACHINE WITH SECOND SYMBOLS SUBSTITUTABLE FOR FIRST SYMBOLS DURING A FEATURE GAME

CROSS REFERENCE TO RELATED APPLICATIONS

This application is based upon and claims the benefit of priority from the prior Japanese Patent Application No. 2004-161944, filed on May 31, 2004 the entire contents of which are incorporated herein by reference.

BACKGROUND OF THE INVENTION

1. Field of the Invention

The present invention relates to a gaming machine such as a slot machine or the like in which symbols arranged in a plurality of rows are variably displayed.

2. Related Art

Conventionally known as a gaming machine which pays out media used in a game such as medals, currencies, and so on (hereinafter, referred to as "coins") is a slot machine. The slot machines of this kind include one having a plurality of reels equipped with symbols on their outer peripheral surfaces (mechanical reels) and one having a plurality of reels (image-type or video-type reels) displayed on a display. Such slot machines are disclosed, for example, in Japanese PCT Unexamined Patent Publication No. 2002-537874 (Patent Document 1) and so on, in which a predetermined operation performed by a player causes the reels on the display to start scrolling to thereby circularly display symbols arranged in a predetermined order. Then, at the time when all of the reels are stopped, coins are paid out according to the combination of the symbols on an activated line (pay line) on the display.

Further, in many slot machines of this kind, two kinds of games, a base game and a feature game (for example, a free game or the like) are prepared.

The feature game is a game having a payout rate of coins higher than that of the base game, and the player plays the base game while looking forward to the game shifting to the feature game.

SUMMARY OF THE INVENTION

However, since the conventional slot machines such as the slot machine disclosed in the above-described Patent Document 1 and so on, in which a condition for shifting to the feature game has been simple or the effect at the time of shift has been monotonous, players familiar with the game have strongly felt that the slot machines are not challenging enough. Therefore, the players are not satisfied with such gaming machines and demand the emergence of novel gaming machines.

Hence, the present invention has been developed to solve the above-described problem and its object is to provide a more interesting gaming machine.

To solve the above problem, a gaming machine according to the present invention is characterized by including: a display means having a plurality of display regions within which a plurality of symbols are variably displayed; a determination means for determining, from a combination of symbols displayed within the plurality of display regions, establishment/non-establishment of a shift condition for shifting a base game to a bonus game, the shift condition being set such that a predetermined number of first symbols are displayed within at least one of the display regions of the display means; and a condition control means for controlling, when the first symbols less than the predetermined number are displayed and a second symbol different from the first symbol is displayed, within the plurality of display regions, to establish the shift condition by the first symbols and the second symbol.

In this gaming machine, when symbols are displayed within the display regions of the display means, the determination means determines, from a combination of displayed symbols, establishment/non-establishment of a shift condition. More specifically, the determination means determines that the shift condition is established when a predetermined number of first symbols are displayed within the display regions of the display means. On the other hand, the determination means determines that the shift condition is not established when the first symbols displayed within the display region of the display means are less than the predetermined number. Incidentally, when the first symbols displayed within the display regions are less than the predetermined number and when a specific second symbol is displayed within the display region, the condition control means controls to establish the shift condition by the first symbols and the second symbol. Therefore, even when the first symbols displayed within the display regions are less than the predetermined number but when the number of display of the first symbols and the second symbol within the display regions satisfies the predetermined number of the shift condition, the shift condition is established. Accordingly, even when the first symbols displayed within the display regions are less than the predetermined number, the player can look forward to the shift to the bonus game and therefore continue enjoying games feeling interest.

In the case of the above-described gaming machine, it is preferable that the determination means determines, based on a arrangement of symbols displayed within the plurality of display regions, establishment/non-establishment of a retrigger condition for re-triggering a bonus game, the restart condition being set such that a predetermined number of first symbols are displayed within at least one of the display regions of the display means; and the condition control means for controlling, when the first symbols less than the predetermined number are displayed and a special second symbol different from the first symbol is displayed, within the plurality of display regions, to establish the retrigger condition by the first symbols and the second symbol.

In this gaming machine, when symbols are displayed within the display regions of the display means, the determination means determines, from a combination of displayed symbols, establishment/non-establishment of a restart condition. More specifically, the determination means determines that the restart condition is established when a predetermined number of first symbols are displayed within the display regions of the display means. On the other hand, the determination means determines that the restart condition is not established when the first symbols displayed within the display region of the display means are less than the predetermined number. Incidentally, when the first symbols displayed within the display regions are less than the predetermined number and when a specific second symbol is displayed within the display region, the condition control means controls to establish the restart condition by the first symbols and the second symbol. Therefore, even when the first symbols displayed within the display regions are less than the predetermined number but when the number of display of the first symbols and the second symbol within the display regions satisfies the predetermined number of the restart condition, the restart condition is established. Accordingly, even when the first symbols displayed within the display regions are less than the predetermined number in the bonus game, the player can look forward to the restart of the bonus game and therefore continue enjoying games feeling interest.

Further, it is also preferable that when the second symbol is displayed within any one display region out of the display regions, the condition control means controls to establish the shift condition by the first symbols and the second symbol. In this case, the game becomes hard to shift to the bonus game by limiting the condition to the time when the second symbol is displayed within the specific display region, so that the payout rate of coins can be decreased as necessary.

Furthermore, it is preferable that when the plurality of second symbols are displayed sequentially within the display regions, the condition control means controls to establish the shift condition by the first symbols and the second symbols. In this case, since a plurality of second symbols are displayed within the specific display region and thus the shift condition is made easy to satisfy by the first symbols and the second symbols displayed within the display regions, the player can with great expectation look forward to the shift to the bonus game and feel more interest.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 8 is a view showing symbol arrangements of the slot machine according to this embodiment;

DESCRIPTION OF THE PREFERRED EMBODIMENTS

Hereinafter, preferred embodiments for carrying out a gaming machine according to the present invention will be described in detail with reference to the accompanying drawings. Note that the same numerals are assigned to the same or equivalent elements, and their description when overlapped will be omitted.

Figure 1:
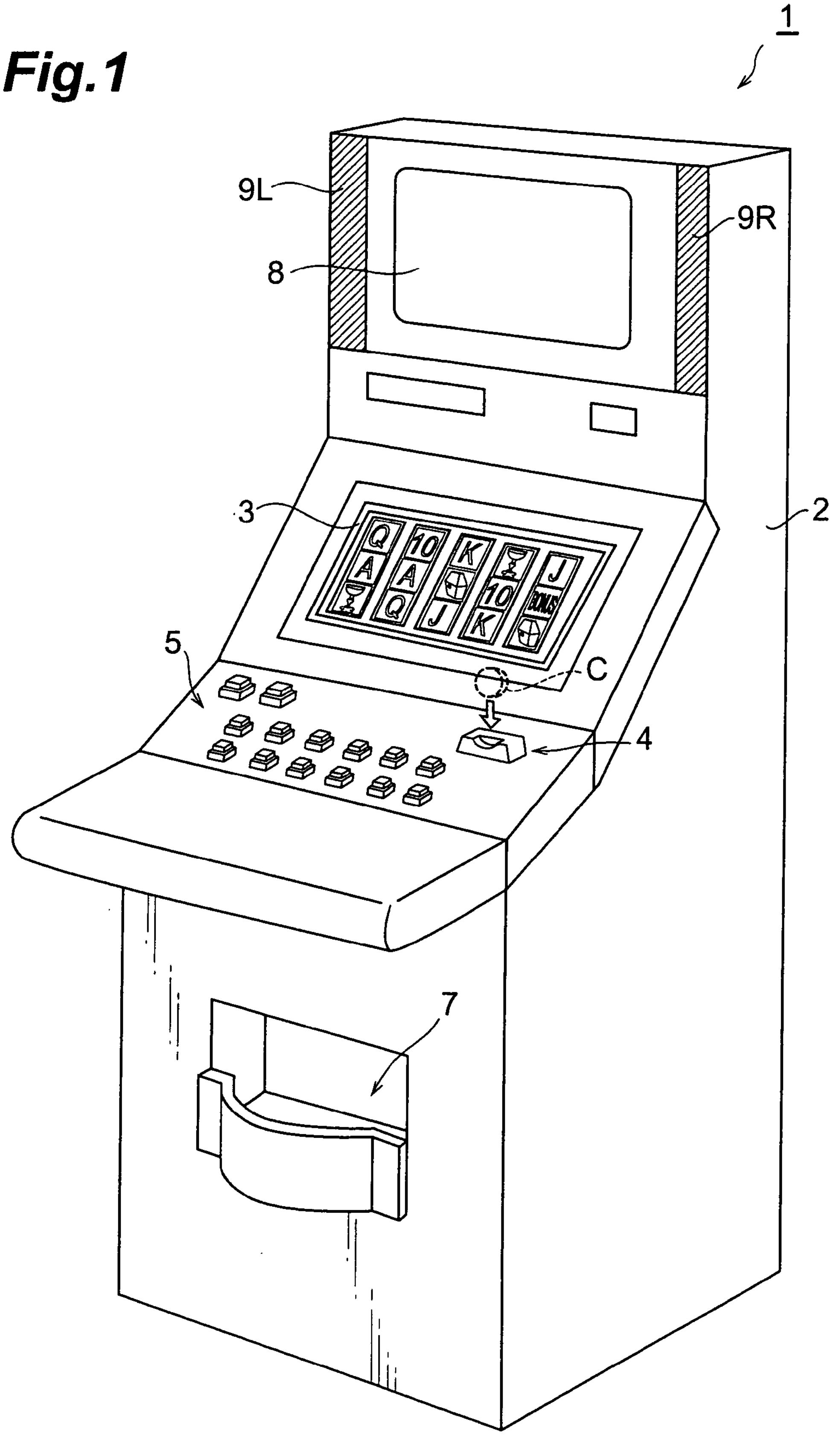
FIG. 1 is an external appearance perspective view showing a slot machine according to an embodiment of the present invention.

FIG. 1 is an overall perspective view showing a slot machine being a gaming machine of this embodiment. The slot machine 1 has a cabinet 2 which is equipped with a display (a display means) 3 composed of a liquid crystal display for digitally displaying a slot game. Below and in front of the display 3, a coin insertion slot 4 is provided into which coins are to be inserted. Note that a bill insertion section may be provided as necessary to allow a slot game to be played with bills.

Figure 2:
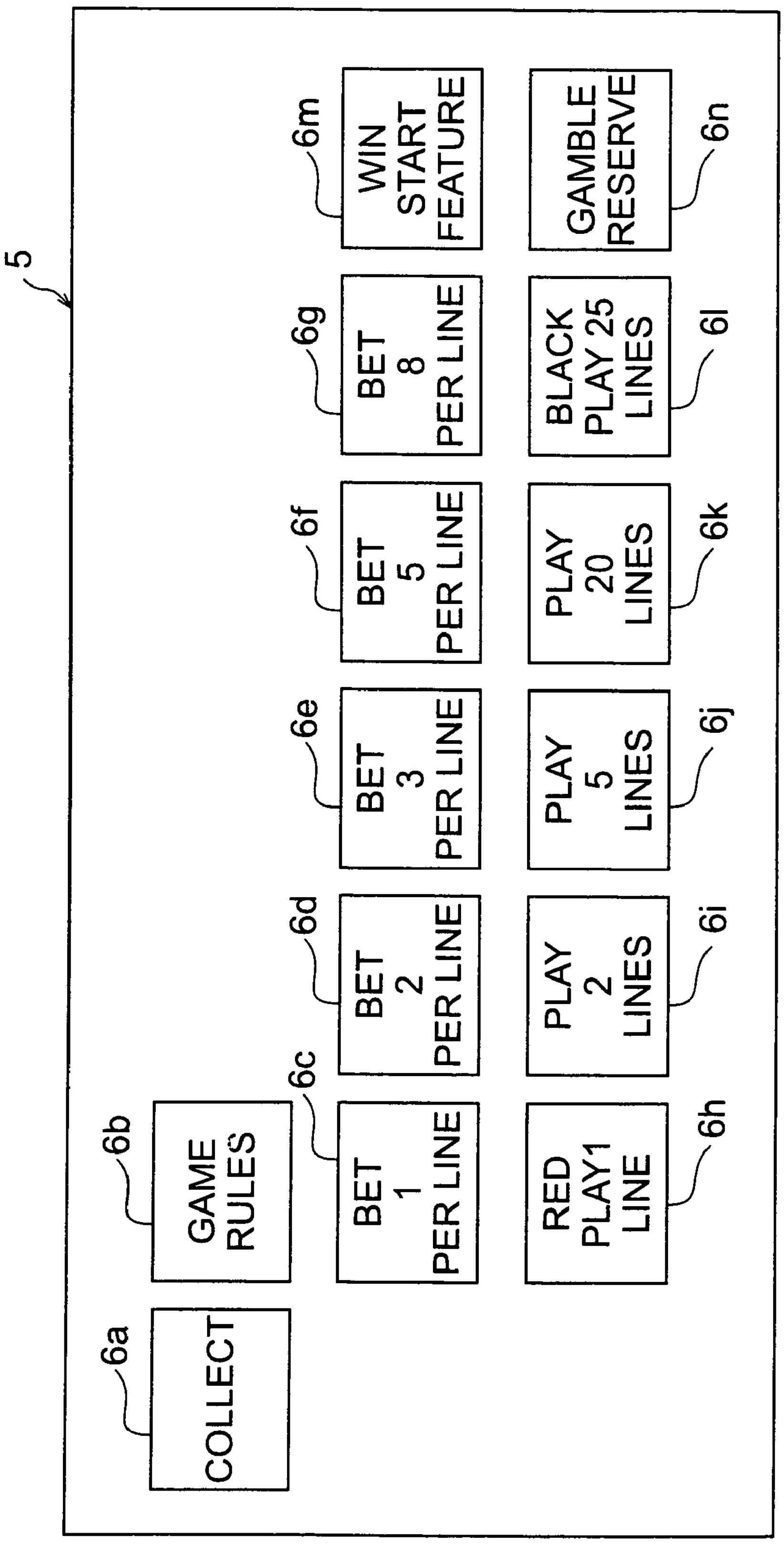
FIG. 2 is a view showing the arrangement of buttons on a control panel.

Below the display 3, a control panel 5 is provided. The control panel 5 is almost the same as provided in well-known slot games, in which 14 buttons **6*a* to 6*n* are provided as shown in FIG. 2**.

More specifically, a collect button (COLLECT) **6*a* for deciding coins acquired in games and a game rule button (GAME RULES) 6*b* for instructing execution of a help function, are provided at the upper left portion of the control panel 5. The other 12 buttons are arranged at two stages in an almost middle portion of the control panel 5 and comprise five bet buttons 6*c* to 6*g* each for determining the number of coins to be betted (the bet number), five line buttons 6*h* to 6*l* each for determining the number of line, a start feature button (START FEATURE) 6*m* for starting a feature game (for example, a free game), and a gamble button (GAMBLE) 6*n*** for determining a shift to a double game at the end of the feature game.

Returning to FIG. 1, a coin tray 7 for a player to receive paid out coins is provided at a lower portion of the cabinet 2. A numeral 8 in FIG. 1 denotes a sub-display on which an image that is not directly associated with the game (for example, explanation of contents of the game, effect image of the feature game, and so on), and numerals 9L and 9R denote a pair of speakers.

Figure 3:
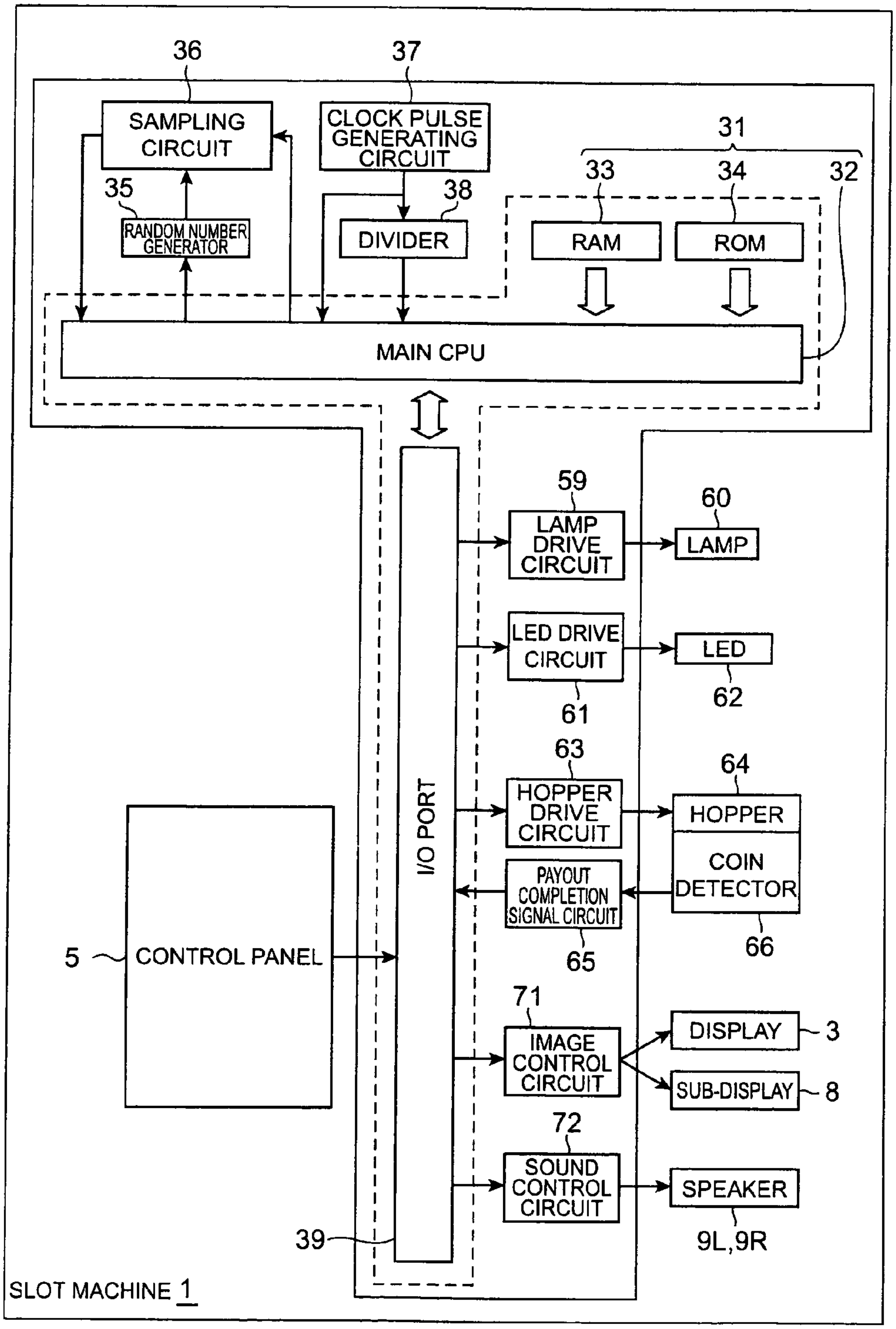
FIG. 3 is a block diagram of a slot machine mainly showing its internal configuration.

FIG. 3 is a block diagram showing the internal configuration of the slot machine 1. As shown in FIG. 3, the slot machine 1 includes a plurality of components around a microcomputer 31.

The microcomputer 31 has a main CPU (Central Processing Unit) 32 being a controller of the present invention, a RAM (Random Access Memory) 33, and a ROM (Read Only Memory) 34.

The main CPU 32 functions in accordance with a program stored in the ROM 34 to input a signal thereinto from each part of the control panel 5, while inputting/outputting signals from/to other components, via an I/O port 39, to thereby control the operation of the entire slot machine 1. The RAM 33 stores data and programs which are used when the main CPU 32 functions, in which, for example, random number values sampled by a later-described sampling circuit 36 are temporarily held after start of a game. The ROM 34 stores programs to be executed by the main CPU 32 and permanent data.

The slot machine 1 further has a random number generator 35, the sampling circuit 36, a clock pulse generating circuit 37, and a divider 38. The random number generator 35 functions in accordance with the instruction from the main CPU 32 to generate random numbers within a fixed range. The sampling circuit 36 samples a given random number from among the random numbers generated by the random number generator 35 in accordance with the instruction from the main CPU 32 and inputs the sampled random number to the main CPU 32. The clock pulse generating circuit 37 generates a reference clock to be used by the main CPU 32, and the divider 38 inputs into the main CPU 32 a signal obtained by dividing the reference clock by a predetermined period.

The slot machine 1 further has a lamp drive circuit 59, a lamp 60, an LED drive circuit 61, an LED 62, a hopper drive circuit 63, a hopper 64, a payout completion signal circuit 65, and a coin detector 66. The slot machine 1 further has an image control circuit 71 for performing control processing of the image to be displayed on the display 3 and the sub-display 8, and a sound control circuit 72 for controlling sound to be generated from the speakers 9L and 9R.

The lamp drive circuit 59 outputs to the lamp 60 a signal for turning on the lamp 60 to cause the lamp 60 to flash during execution of a game. With this flash, effect of the game is executed. The LED drive circuit 61 controls flashes display of the LED 62. The LED 62 performs credit number display, acquired-coin number display, and so on. The hopper drive circuit 63 drives the hopper 64 in accordance with the control of the main CPU 32, and the hopper 64 performs operation for paying out coins to pay out coins from the coin tray 7.

The coin detector 66 counts the number of coins paid out by the hopper 64 and sends data of the counted number value to the payout completion signal circuit 65. The payout completion signal circuit 65 inputs the data of the number value of coins from the coin detector 66 thereinto and inputs a signal notifying completion of the payout of coins into the main CPU 32 when the number value reaches data of the set number.

The image control circuit 71 controls image display on each of the display 3 and the sub-display 8 to cause the display 3 and the sub-display 8 to display various images such as later-described symbol images and the like.

Figure 4:
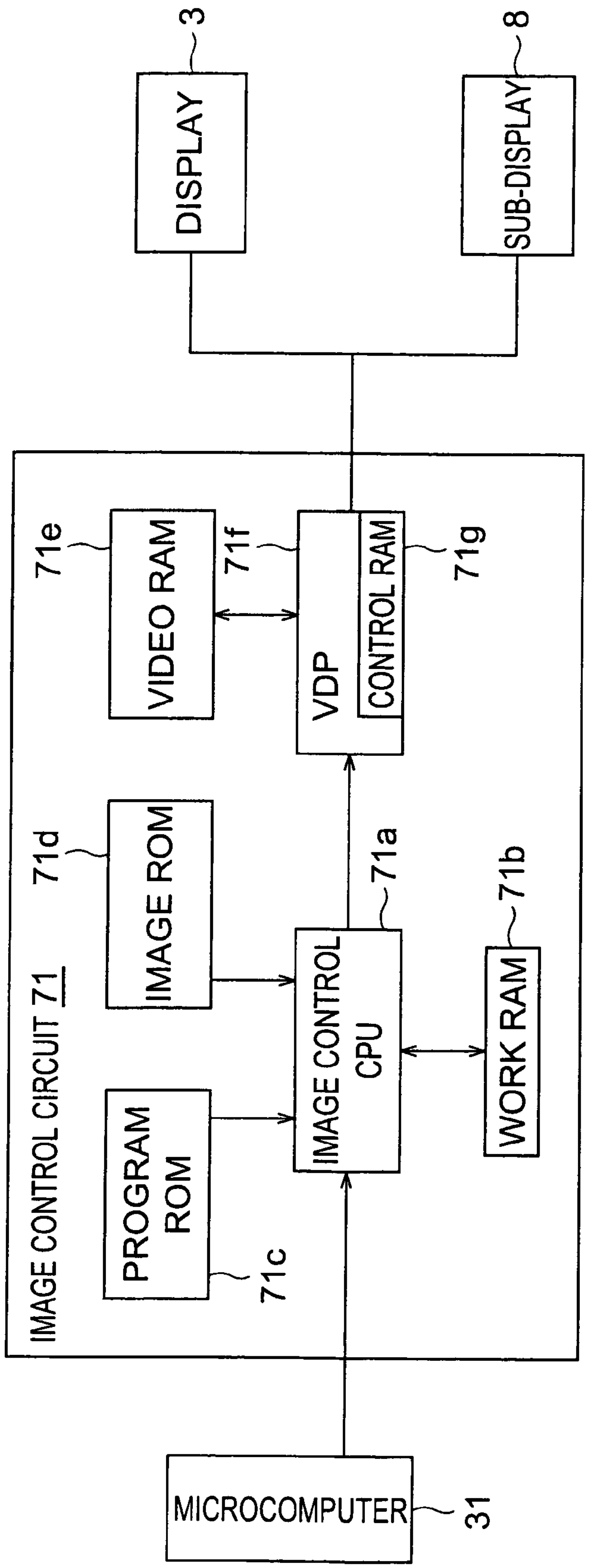
FIG. 4 is a block diagram showing an example of the internal configuration of an image control circuit.

The image control circuit 71 has, as shown in FIG. 4, an image control CPU 71*a*, a work RAM 71*b*, a program ROM 71*c*, an image ROM 71*d*, a video RAM 71*e*, and a VDP (Video Display Processor) 71*f*. The image control CPU 71*a* determines the images (symbol images and the like) to be displayed on the display 3 and the sub-display 8 based on parameters set by the microcomputer 31 and in accordance with an image control program stored in the program ROM 71*c* in advance. The work RAM 71*b* is constituted as a temporary memory when the image control CPU 71*a* executes the image control program.

The program ROM 71*c* stores the image control program, various selection tables, and so on. The image ROM 71*d* stores dot data for forming images. The dot data includes, in this embodiment, data on various symbol images (hereinafter referred to as a "symbol image group"). The video RAM 71*e* is constituted as a temporary memory when the VDP 71*f* forms images. The VDP 71*f*, having a control RAM 71*g*, forms images matching the display contents on the display 3 and the sub-display 8 determined by the image control CPU 71*a*, and outputs the respective formed images to the display 3 and the sub-display 8.

Figure 5:
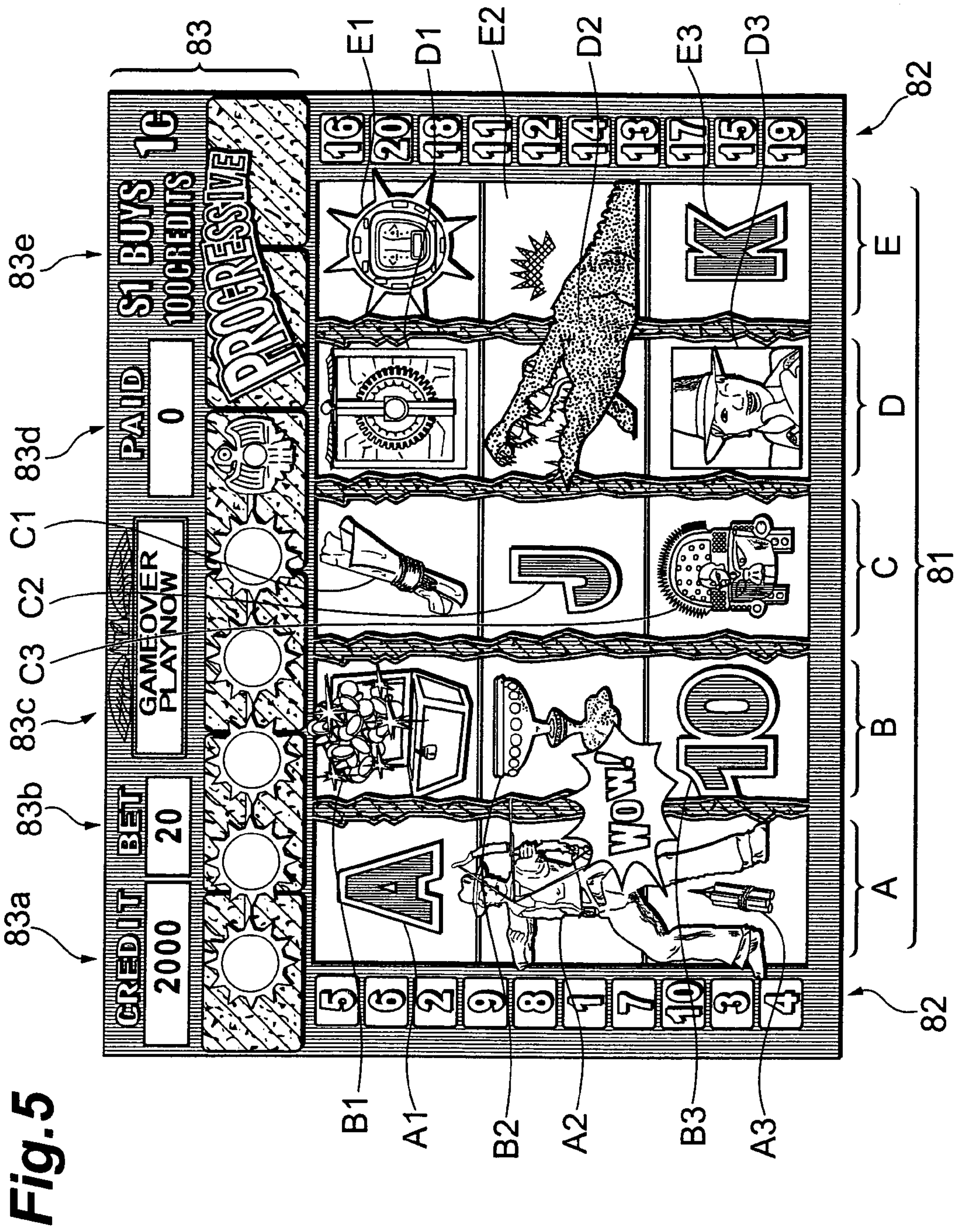
FIG. 5 is a view showing a display screen of a display.

FIG. 5 is a view showing the display screen of the display 3. In this embodiment, a display region section 81, line number display sections 82, and an upper display section 83 are displayed on the display 3.

Within the display region 81, display regions A to E in each of which three symbols are to be displayed are provided in five columns. Within each of the display regions A to E, a reel image in which a plurality of kinds of symbols are drawn is variably displayed such that it is rotationally displayed. In addition, image processing is performed such that symbols selected when the respective reel images are stopped are displayed within the symbol display regions A1 to A3, B1 to B3, C1 to C3, D1 to D3, and E1 to E3.

On both sides of the display region section 81, the line number display sections 82 are displayed where the line numbers showing respective pay lines are displayed. Among the line numbers displayed within the line number display sections 82, the number corresponding to the pay line which the player has selected is brought into a turned-on display while the numbers which the player has not selected are brought into a turned-off display.

On the upper side of the display region section 81, the upper display section 83 is formed. The upper display section 83 is composed of a credit number display section, a BET number display section, a character information display section, a PAID number display section, and a fee display section. The number of coins currently credited is here displayed in the credit number display section, and the number of coins betted in one game is displayed in the BET number display section. Further, character information showing the current state of the game is displayed in the character information display section in which, for example, when the game shifts to the feature game, character information reporting the feature game is displayed. Further, the number of coins which could have been acquired in one game is displayed in the PAID number display section, and CREDIT is displayed in the fee display section.

Figure 6:
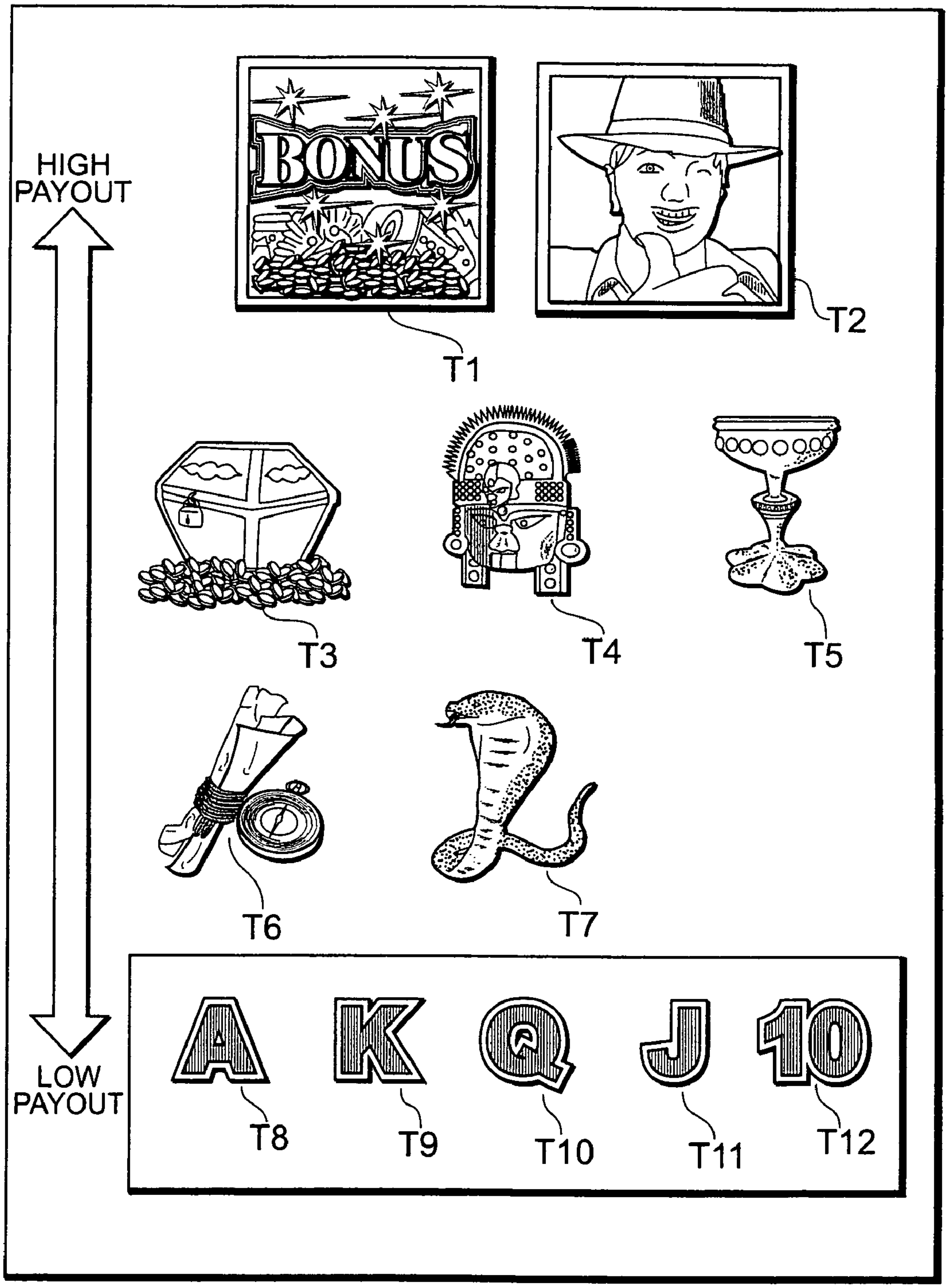
FIG. 6 is a view showing symbols to be displayed on the display.

FIG. 6 is a view enumerating and showing symbols to be displayed on the respective display regions. The symbols in this embodiment include special symbols composed of a bonus symbol T1, a wild symbol T2, a jewel box symbol T3, a mask symbol T4, a chalice symbol T5, a map symbol T6, a snake symbol T7, and normal symbols composed of five kinds of playing card marks.

The bonus symbol (a first symbol) T1 being the special symbol is a symbol (a scatter symbol) being a trigger into the feature game. For the slot machine 1, for example, when this bonus symbol T1 are displayed in a predetermined number (for example, four or more) in the display regions A to E, the base game shifts to the feature game. Incidentally, as long as this bonus symbol T1 are displayed in a predetermined number within the display regions A to E, the base game shifts to the feature game, in which any display position and arrangement at that event are acceptable.

Further, the wild symbol (a second symbol) T2 being the special symbol replaces as any of the five kinds of special symbols, that is, the above-described jewel box symbol T3, mask symbol T4, chalice symbol T5, map symbol T6, and snake symbol T7 and as the five kinds of normal symbols.

The playing card symbols include an ace symbol ("A") T8, a king symbol ("K") T9, a queen symbol ("Q") T10, a jack symbol ("J") T11, and a numeric symbol ("10") T12.

Figure 7:
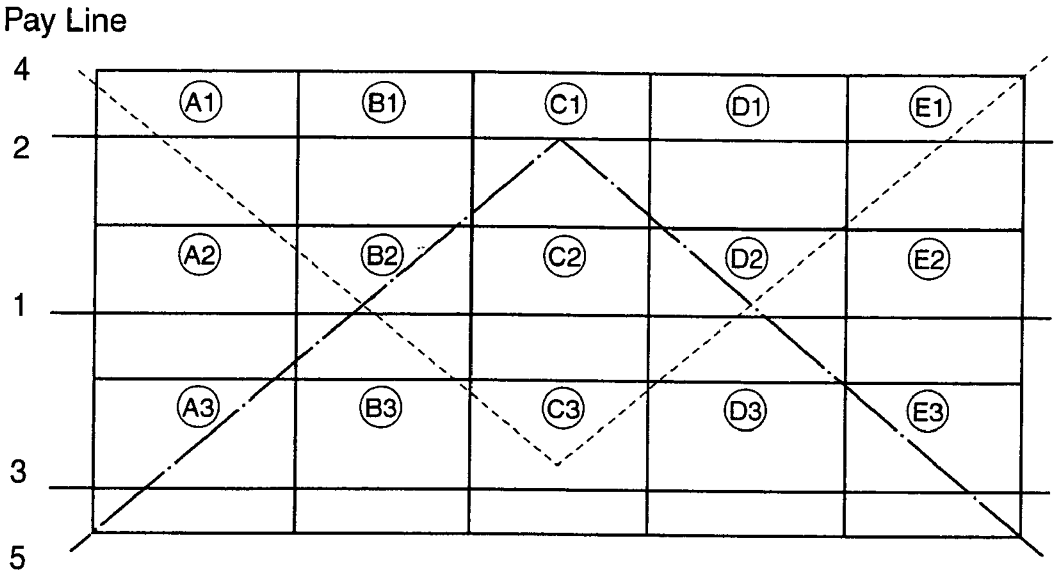
FIG. 7 is diagrams showing examples of a pay line of the slot machine, (a) being a diagram showing one example, and (b) being a diagram showing another example.
Figure 7:
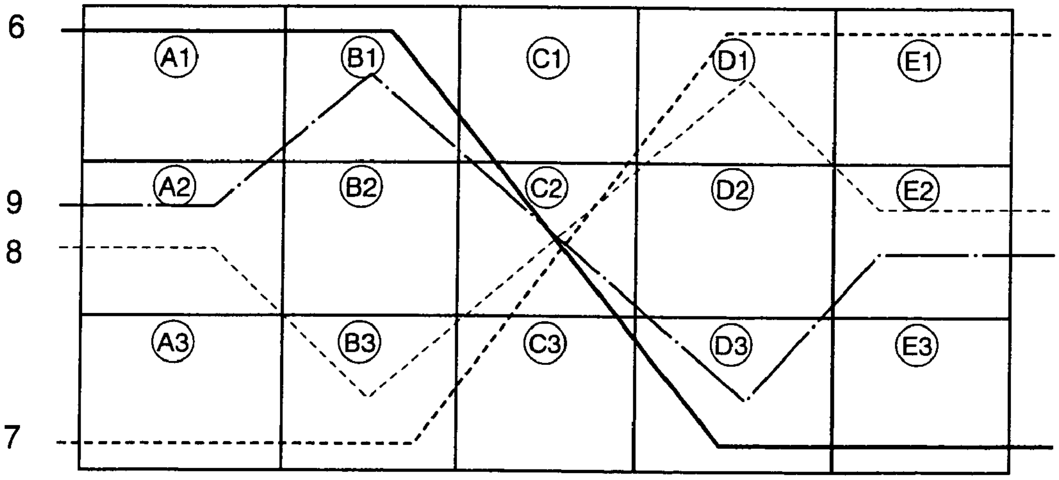

FIG. 7(*a*) and FIG. 7(*b*) are diagrams showing examples of pay lines of the slot machine 1. For easy understanding, the pay lines are shown in two divided diagrams. As shown in the diagrams, nine pay lines are prepared as an example. When a predetermined winning combination is arranged on any of these pay lines, a payout corresponding to the contents of the winning combination is paid to the player. Through the illustration is omitted, other 11 pay lines are prepared, 20 pay lines in total being prepared. As described above, in the slot machine 1 in this embodiment, wide variety of pay lines can be provided since the number of columns is large, such as five columns.

Further, winning determination is performed depending on whether or not the same symbols are aligned on the pay line designated by the player using the line buttons 6*h* to 6*l*, among the twenty pay lines set within the symbol display regions A1 to A3, B1 to B3, C1 to C3, D1 to D3, and E1 to E3. When the same symbols are aligned on the pay line which the player has designated, it is determined that the winning condition is established, and a predetermined number of coins are paid. In this winning determination, the wild symbol T2 replaces and treated as a symbol advantageous to the payout (the number of payout of coins) among the above-described ten kinds of symbols. More specifically, even when only the ace symbols T8 and the wild symbols T2 are aligned within all of the symbol display regions on one pay line, the same number of coins are paid as when the ace symbols T8 are aligned within all of the symbol display regions on one pay line. In this case, the wild symbol T2 is treated as the ace symbol T8 on the pay line.

Next, arrangements of symbols to be displayed respectively within the respective display regions A to E will be described with reference to FIG. 8. As shown in FIG. 8, 30 symbols arranged in a predetermined order is circularly displayed in a scroll manner within each of the display regions A to E and recognized by the player as if mechanical reels rotated and variably displayed the symbols. Within the display regions A to E, the symbols may be displayed in a scroll manner in the same cycles or displayed in a scroll manner in cycles different from each other. In the symbol arrangement displayed within the display region C of the symbol arrangements displayed within the five display regions A to E, three wild symbols T2 are continuously arranged.

It should be noted that in the slot machine 1, a base game and a feature game (a bonus game in the present invention) are prepared in proceeding of a game. The main CPU 32 of the microcomputer 31 performs a determination whether or not the feature game shift condition is established, and if the feature game shift condition is established, the feature game is executed. The feature game shift condition is, as described above, that a predetermined number of bonus symbols T1 are displayed within the display regions A to E. Note that the payout rate of coins in the feature game is set to be higher than the payout rate in the base game. In other words, the feature game is a game very advantageous to the player in terms of receiving payment of coins. Therefore, the player plays the base game looking forward to the game shifting to the feature game.

Figure 9:
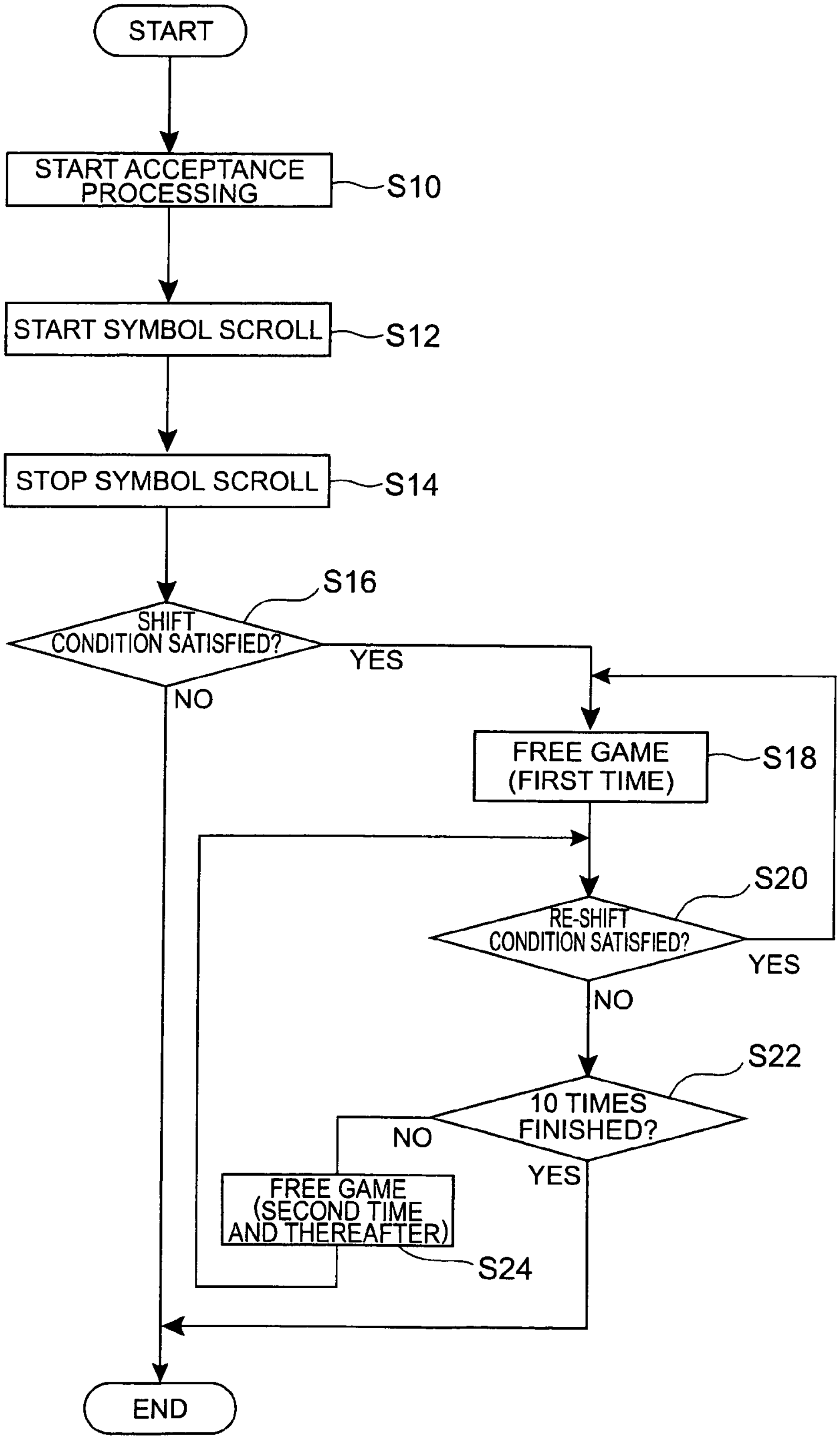
FIG. 9 is a flowchart showing game proceeding in the slot machine.

Next, a control method of the slot machine 1 according to this embodiment will be described. FIG. 9 is a flowchart showing the game proceeding in the slot machine 1.

After starting the main processing, the slot machine 1 first executes start acceptance processing for starting a game (S10). More specifically, the main CPU 32 accesses the ROM 34 to transfer information on a basic screen such as a frame and so on to be displayed on the display 3 to the image control circuit 71, and the image control circuit 71 once stores the received information in the vide RAM 71*e* and then displays it on the display 3. This brings the slot machine 1 into a state in which the player can play the slot game. The following processing is performed by the main CPU 32 executing the information on the slot game in the program stored in the ROM 34 and the RAM 33. Note that at the time when the slot machine 1 is started, it is in a state in which the base game is performed as the slot game.

Then BET by the player is waited at this step S10, and when coins in the number to be bet in one game are inserted through the coin insertion slot 4, or when the bet buttons 6*c* to 6*g* are pressed when there are any credits, the game is started and the symbols displayed within the respective display regions A to E are scrolled (S12). In this event, the main CPU 32 controls the image control circuit 71 to perform image processing as if the mechanical reels rotate. Further, the main CPU 32 determines the symbols to be displayed within the display regions A to E respectively after the stop of scroll through use of the random number values sent from the sampling circuit 36, and stops the scroll to display the determined symbols on the display 3 (S14).

After the stop of the scroll, the main CPU 32 determines whether or not the feature game shift condition is established (S16). More specifically, when the number of the bonus symbols T1 displayed within the display regions A to E on the display 3 is four or more, the feature game shift condition is determined by the main CPU 32 to be established, while when the number of the bonus symbols T1 displayed is three or less, the feature game shift condition is determined not to be established. Then, when the main CPU 32 determines that the feature game shift condition is established, the feature game is executed, while when it determines that the condition is not established, the processing flow ends.

When the main CPU 32 determines that the feature game shift condition is established, the game in the slot machine 1 shifts from the base game to the feature game in which at least a set of 10 free games are played. In other words, the main CPU 32 alternately repeats the above-described processing similar to that at Step S12 and the processing similar to that at Step S14 without the player inserting coins or pressing the bet buttons 6*c* to 6*g*. Accordingly, since the player can receive payment of coins without betting coins or credit number during the free games, the player has great advantages in terms of acquiring coins.

Hereinafter, the game proceeding during the feature game will be described in more detail.

In the feature game, after a first free game out of the ten free games is executed (S18), the main CPU 32 functions as a determination means to determine whether or not a feature game re-shift condition is established (S20). The feature game re-shift condition here is a condition for starting again (retriggering) the feature game (the bonus game) from the first free game (irrespective of the number of times of free game which have been played, during the feature game). Namely, another set of free games is triggered, even if the first set of free games are already counted to, for example, five at S24. In other words, the feature game re-shift condition is a condition for shifting from the game where the number of times of execution increases every time the free game is executed to the game in which the number of times of execution is cancelled (that is, another set of ten free games is given again). The feature game re-shift condition is the same condition as the above-described feature game shift condition. In other words, when the number of bonus symbols T1 displayed within the display regions A to E of the display 3 is four or more, the main CPU 32 determines that the feature game re-shift condition is established, while when the number of bonus symbols T1 displayed is three or less, the main CPU 32 determines that the feature game re-shift condition is not established.

Then, when the main CPU 32 determines that the feature game re-shift condition is not established, the main CPU 32 verifies the number of times of free game at Step S22 subsequent to Step S20. If the number of times of execution of free game is ten, the processing flow ends, while if it is less than ten, a second free game and/or the remaining free games is executed (S24). Also after the second free game and/or the remaining free games is executed, the main CPU 32 determines whether or not the feature game re-shift condition is established (S20) similarly after the execution of the first free game, and this flow is repeated until the total number of times of execution of free game reaches ten.

If the main CPU 32 determines that the feature game re-shift condition is established after the execution of the first free game or after the second free game and/or the remaining free games is executed, the feature game is retriggered and the first free game is executed (S18). More specifically, when the feature game re-shift condition is established, the flow returns to the state immediately after the shift to the feature game irrespective of the number of times of free game which have been executed, and the first free game is executed. In this case, the player acquires the right of ten free games and therefore has great advantages in terms of acquiring coins.

Figure 10:
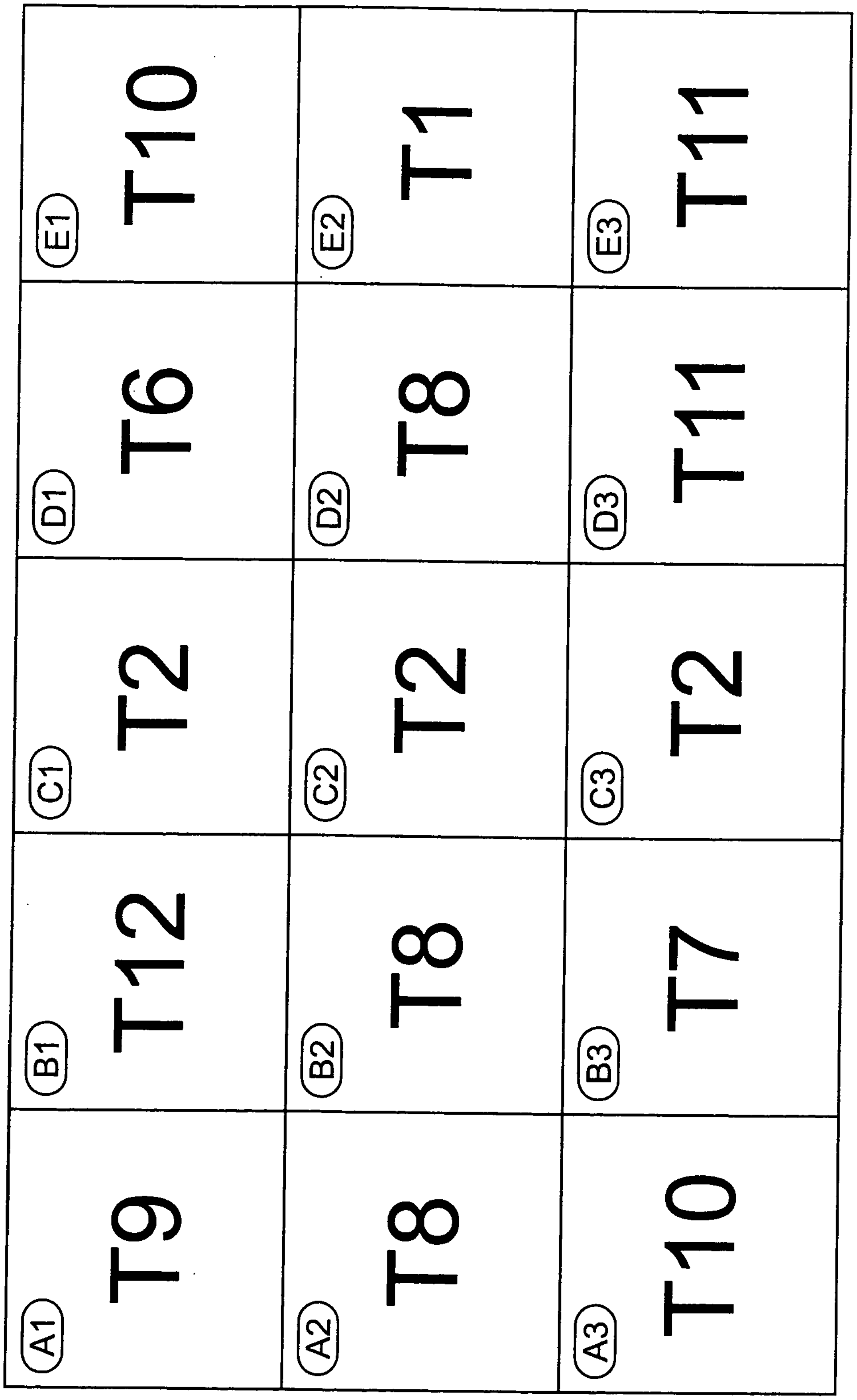
FIG. 10 is a view showing the symbol arrangement with predetermined symbols being displayed within predetermined display regions.

In determination of the feature game re-shift condition in the feature game, if the number of bonus symbols T1 displayed within the display regions A to E is three or less (for example, one) and when the three sequential wild symbols T2 are displayed within the display region C (see FIG. 10), the main CPU 32 functions as a condition control means control to establish the feature game re-shift condition by the bonus symbols T1 displayed within the display regions A to E and the wild symbols T2. Therefore, if one or more bonus symbols T1 are displayed within the display regions A to E, the number of display of the bonus symbols T1 and the wild symbols T2 displayed within the display regions A to E is four or more, and the main CPU 32 determines that the feature game re-shift condition is established, and the feature game is retriggered in which the first free game is executed (S18).

Accordingly, in the slot machine 1, even when the bonus symbols T1 less than four are displayed within the display regions A to E but when three sequential wild symbols T2 appear within the display region C, the player can with great expectation look forward to the retrigger of the free game and therefore continue enjoying games feeling interest. In short, this slot machine 1 is more interesting than the conventional slot machines. Incidentally, since a portion of the condition on which the main CPU 32 functions as the condition control means is the time when three sequential wild symbols T2 are displayed within the display region C, the predetermined number (four or more) being the feature game re-shift condition is made easy to satisfy as compared to the case where the portion of the condition is the time when one or two wild symbols T2 are displayed within the display region C. Accordingly, the player can with great expectation look forward to the shift to the retrigger of the free game and feel more interest.

Note that the present invention is not limited to the above-described embodiment, but various modifications can be made. For example, the condition where the main CPU 32 functions as the condition control means is not limited to the time when the number of bonus symbols T1 displayed within the display regions A to E is three or less and when three sequential wild symbols T2 are displayed within the display region C, but may be also to the time when as shown below. That is the time when the number of bonus symbols T1 displayed within the display regions A to E is three or less and (1) when a portion of the three sequential wild symbols T2 are displayed within the display region C; (2) when the wild symbol T2 is displayed within a specific display region of the display regions A to E (for example, the display region A); (3) when the wild symbol T2 is displayed within at least one display region of the display regions A to E, or the like. For the case of (2), the game is more difficult to shift to the retrigger game compared to the case of (3), by limiting the portion of the condition where the main CPU 32 functions as the condition control means to the time when the wild symbol T2 is displayed within the display region A, so that the payout rate of coins can be decreased as necessary.

Further, in the determination of the feature game re-shift condition in the feature game, when the main CPU 32 functions as the condition control means, the main CPU 32 may control to establish the feature game re-shift condition through use of the bonus symbols T1 displayed within the display regions A to E and use of the symbols other than the bonus symbol T1 and the wild symbol T2.

In addition, although the case in which the main CPU 32 functions as the condition control means in determining the feature game re-shift condition (see S20 in FIG. 9) has been exemplified in the above-described embodiment, the main CPU 32 may function as the condition control means in determining the feature game shift condition (the shift condition) (see S16 in FIG. 9). In other words, such an aspect is acceptable in which, in determining the feature game shift condition during the base game, when the number of bonus symbols T1 displayed within the display regions A to E on the display 3 is less than four and when three sequential wild symbols T2 are displayed within the display region C, the main CPU 32 conducts a control to establish the feature game shift condition by the bonus symbols T1 displayed within the display regions A to E and the wild symbols T2.

Further, the slot machine is not limited to the video slot machine, but a slot machine having mechanical reels. Further, the number of display regions on the display is not limited to five, but may be increased or decreased when necessary to, for example, three or nine.

The re-shift condition may be established not only after the first free game, but also after the second or the following free games. Namely, the establishment of the re-shift condition may be carried out at a suitable timing during the execution of feature game. Although a set of feature game is comprised of 10 free games, in the present invention, the number of free games may be changed suitably According to the present invention, a more interesting gaming machine is provided.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A gaming machine comprising:

(i) a display device on which a plurality of symbols are displayed;

(ii) a memory for storing data concerning the plurality of symbols to be displayed on the display device; and (iii) a controller, wherein:

the plurality of symbols include:

one or more first symbols each treated as a symbol for shifting a base game to a feature game; and one or more second symbols each treated as a symbol substitutable for any one of the plurality of symbols except the first symbol during the base game, and treated as a symbol substitutable for all of the plurality of symbols during the feature game, including the first symbol; and the controller is configured to:

(a) display a first subset of the plurality of symbols in a display region of the display device for the base game, the first subset including at least one first symbol and at least one second symbol;

(b) shift the base game to the feature game in a case where a number of the first symbols displayed within the first subset reach a predetermined number during the base game;

(c) display a second subset of the plurality of symbols in the display region of the display device for the feature game, the second subset including at least one first symbol and at least one second symbol; and (d) establish a retrigger for shifting the feature game to a next feature game in a case where a judgment is made that a condition for a first trigger that the number of the first symbols in the second subset reaches the predetermined number is satisfied, or a case where a judgment is made that a condition for a second trigger that a sum of the number of the first symbols in the second subset that is less than the predetermined number and a sum of a number of the second symbols in the second subset reaches the predetermined number is satisfied.

2. The gaming machine according to claim 1, wherein:

determination of a prize during the base game is made by determining a normal prize under a payline system and determining a shift condition for the feature game under a scatter system based on whether or not the first symbols reach the predetermined number as described in (b); and the controller executes a process for the normal prize in a case where a combination of a plurality of symbols other than the first symbol or a combination of said symbol other than the first symbol and the second symbol is displayed on a payline displayed within the display region of the display device.

3. The gaming machine according to claim 1, wherein:

the predetermined number of the first and second symbols as the second trigger in (d) includes more second symbols than first symbols.

4. The gaming machine according to claim 1, wherein:

the second trigger in (d) includes at least two second symbols displayed in series within the display region of the display device.

* * * * *